United States Patent
King et al.

(10) Patent No.: US 7,792,153 B2
(45) Date of Patent: Sep. 7, 2010

(54) SEQUENCING MULTI-SOURCE MESSAGES FOR DELIVERY AS PARTIAL SETS TO MULTIPLE DESTINATIONS

(75) Inventors: Brett G King, Cary, NC (US); Aaron J Tarter, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 11/382,118

(22) Filed: May 8, 2006

(65) Prior Publication Data

US 2007/0257786 A1 Nov. 8, 2007

(51) Int. Cl.
*H04J 3/07* (2006.01)
(52) U.S. Cl. ...................................... 370/503
(58) Field of Classification Search ................ 370/503, 370/504, 505
See application file for complete search history.

(56) References Cited

U.S. PATENT DOCUMENTS

| | | | |
|---|---|---|---|
| 6,023,769 A * | 2/2000 | Gonzalez | 713/400 |
| 6,088,734 A | 7/2000 | Marin et al. | |
| 6,353,604 B2 * | 3/2002 | Grimwood et al. | 370/335 |
| 6,725,278 B1 * | 4/2004 | Gonzalez | 709/248 |
| 6,879,589 B2 | 4/2005 | Sera | |
| 6,922,731 B1 | 7/2005 | Morioka et al. | |
| 6,940,855 B2 * | 9/2005 | Okamura | 370/389 |
| 7,257,133 B2 * | 8/2007 | Jeske et al. | 370/507 |
| 2002/0042839 A1 | 4/2002 | Peiffer et al. | |
| 2004/0093435 A1 * | 5/2004 | Purho | 709/400 |
| 2004/0215810 A1 | 10/2004 | Tan et al. | |
| 2006/0236219 A1 * | 10/2006 | Grigorovitch et al. | 715/500.1 |
| 2006/0245530 A1 * | 11/2006 | Pradhan et al. | 375/364 |
| 2007/0135079 A1 * | 6/2007 | Bromley | 455/343.1 |

* cited by examiner

*Primary Examiner*—Derrick W Ferris
*Assistant Examiner*—Mohammad Anwar
(74) *Attorney, Agent, or Firm*—Jeanine S. Ray-Yarletts, Esq.; Steven M. Greenberg, Esq.; Carey Rodriguez Greenberg & Paul LLP

(57) ABSTRACT

Embodiments of the present invention address deficiencies of the art in respect to multi-source messaging and provide a method, system and computer program product for sequencing multi-source messages for delivery to multiple destinations. In one embodiment, a multi-source message synchronization data processing system can be provided. The system can include a common clock and a message server configured for communicative coupling to a multiple message sources, each message source including a corresponding clock synchronized with the common clock. Multi-source message sequencing logic can be coupled to the message server and can include program code enabled to concatenate different message sequences produced by different ones of the message sources into a unified message sequence based upon timestamps applied by the message sources to messages in respective ones of the message sequences.

6 Claims, 3 Drawing Sheets

SEQUENCING MULTI-SOURCE MESSAGES FOR DELIVERY AS PARTIAL SETS TO MULTIPLE DESTINATIONS

BACKGROUND OF THE INVENTION

1. Field of the Invention

The present invention relates to the field of multi-source messaging and more particularly to sequencing multi-source messages for delivery to a destination.

2. Description of the Related Art

In the modern network architecture, data can be passed from source to destination across multiple, redundant paths in many different segments. In this regard, data can be segmented into packets and individually transmitted from source to destination. Depending upon the latencies experienced in the different paths of communication to the destination, different packets can arrive at different times in different orders. As such, re-assembling the packets into the proper order cannot depend only upon the order in which the packets are received at the destination. Rather, each packet can encapsulate a sequence number, however, to facilitate the proper ordering of packets upon reconstruction of the data at the destination.

Similar to data passing at the network level, in event processing architectures, including the enterprise service bus (ESB) architecture, or the common event infrastructure architecture, a sequence of messages for an event can be transmitted from source to destination and can arrive at different times at the destination, not necessarily in the same order in which the messages are transmitted. To compound matters, oftentimes, multiple sources can emit the messages intended for the destination. Yet worse, in many cases, multiple destinations can subscribe to the receipt of all or only a portion of the messages. Accordingly, merely assigning a sequence number to each message cannot provide a comprehensive solution given the many message sources involved.

To address the problem of sequencing multi-source messages, some have suggested imposing centralized authority over the assignment of sequence numbers when sending multiple messages. Specifically, it has been proposed to require that each source in a multi-source messaging system defer to the judgment of a centralized authority in assigning sequence numbers to messages. In this way, the centralized authority can ensure that each message is uniquely numbered in accordance with a proper sequence so that recipients can amply reconstruct the sequence of messages. Notwithstanding, it is to be recognized that deploying a centralized authority in a multi-source messaging system can impose unduly burdensome delays in message processing.

Ordering messages in a multi-source messaging system can be important for several reasons. First, destination recipients of the messages must know how to re-assemble the proper sequence of messages so as to properly interpret the stream of messages and to respond accordingly. Also, by knowing the proper sequence of messages, one can easily detect message loss. Yet, at present one can provide for proper sequencing of messages only at the expense of processing performance due to the overhead of interacting with a centralized authority.

BRIEF SUMMARY OF THE INVENTION

Embodiments of the present invention address deficiencies of the art in respect to multi-source messaging and provide a novel and non-obvious method, system and computer program product for sequencing multi-source messages for delivery to multiple destinations. In one embodiment of the invention, a multi-source message synchronization data processing system can be provided. The system can include a common clock and a message server configured for communicative coupling to a multiple message sources, each message source including a corresponding clock synchronized with the common clock.

In the embodiment, multi-source message sequencing logic can be coupled to the message server. The sequencing logic can include program code enabled to concatenate different message sequences produced by different ones of the message sources into a unified message sequence based upon timestamps applied by the message sources to messages in respective ones of the message sequences. In this regard, the timestamps can include a current timestamp and a previous timestamp. Moreover, each of the different message sequences can include multiple different messages wherein the previous timestamp of a message refers to a current stamp of a previous message.

In another embodiment of the invention, a method for sequencing multi-source messages can include synchronizing a local clock for a message source with a common clock for the message source and other message sources, timestamping a sequence of messages for transmission to a message server utilizing the local clock, and transmitting the sequence of messages to the message server for delivery to at least one message destination. For instance, synchronizing a local clock for a message source with a common clock for the message source and other message sources can include requesting a time from the common clock according to the network time protocol (NTP), and setting the local clock with a time received from the common clock according to the NTP.

In the embodiment, timestamping a sequence of messages for transmission to a message server utilizing the local clock can include setting a current timestamp for a current message to a current time provided by the local clock, and setting a previous timestamp for the current message according to a current timestamp for a previous message transmitted immediately previously to the current message. Finally, the method can include transmitting a heartbeat to the message server until no more messages remain to be transmitted as part of the sequence of messages.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for sequencing multi-source messages for delivery to multiple destinations. In accordance with an embodiment of the present invention, different message sources can synchronize individual, corresponding clocks with one another. Subsequently, messages forwarded from each of the message sources to one or more message destinations can include both a current timestamp and a previously used timestamp for a message transmitted immediately beforehand.

As messages are received in a message server from the multiple message sources, the messages can be sequenced for each message source according to timestamp. When it is determined that a complete sequence of messages has been received from a particular message source, the complete sequence of messages from the message source can be combined with different message sequences from other message sources according to timestamp. In this way, the message sequences from each of the message sources can be combined into a single, ordered message sequence for distribution in whole or in part to one or more specified destinations.

Figure 1:
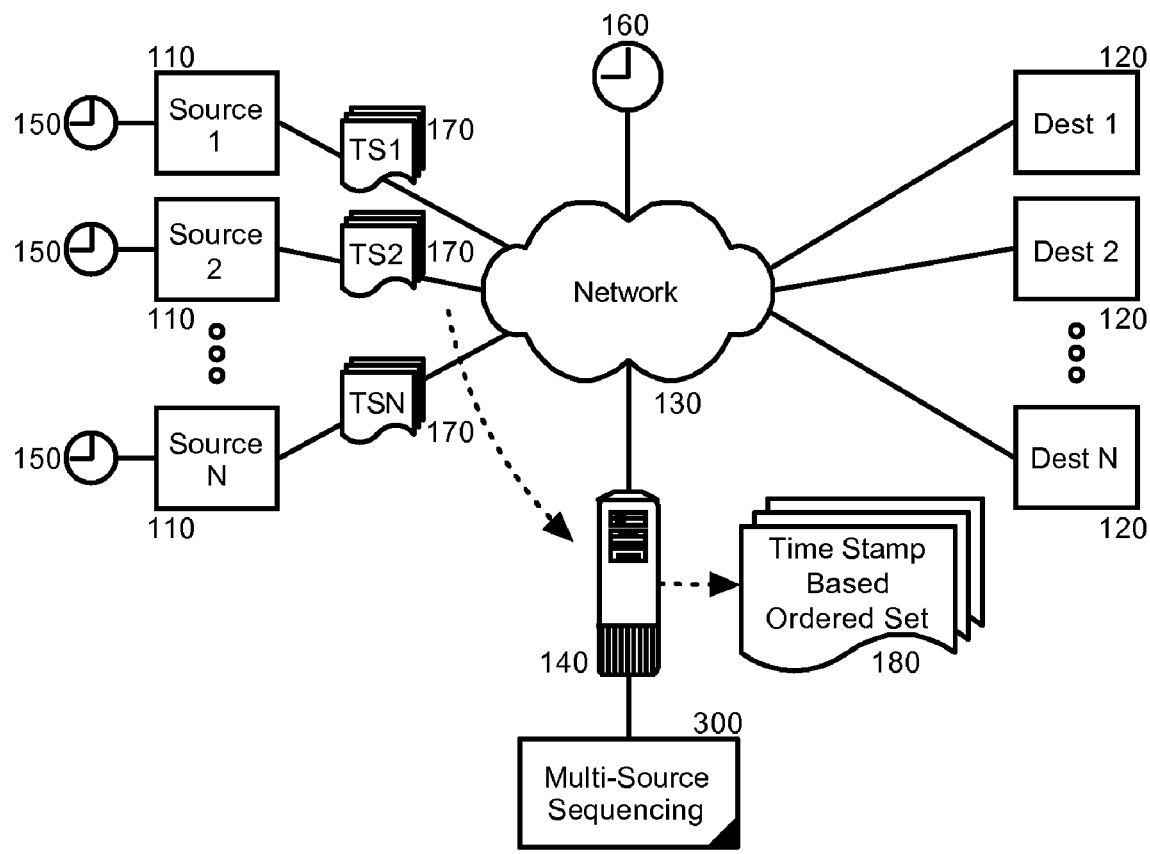
FIG. 1 is a schematic illustration of an event processing architecture enabled for sequencing multi-source messages for delivery to multiple destinations.

In further illustration, FIG. 1 is a schematic illustration of an event processing architecture enabled for sequencing multi-source messages for delivery to multiple destinations. The system can include one or more message sources 110 communicatively coupled to one or more message destinations 120 over a computer communications network 130. Each of the message sources 110 can be coupled to a corresponding clock 150 synchronized with a common clock 160 such as through a time server configured to provide on request a common time value via the NTP.

Each of the messages sources 110 can include program code enabled to time stamp individual messages 170 with a current time in addition to a previous time. The previous time can be the most recently used current time applied to a previous message. In this way, each of the messages 170 processed by each of the message sources 110 can be linked to an immediate, prior one of the messages 170 so as to establish a proper time sequencing of messages 170 originating from each of the message sources 110.

A message server 140 further can be communicatively coupled to each of the message sources 110 and the message destinations 120. The message server 140 can include multi-source sequencing logic including program code enabled to process messages 170 received from different ones of the message sources 110 in order to produce a time stamp based ordered set of messages 180. In this regard, as complete sequences of messages 170 are received from any one of the message sources 110, the complete sequence of messages 170 can be combined with other complete sequences of messages 170 according to time stamp in order to fully assemble a properly ordered sequence of messages 170 from all of the message sources 110.

Figure 2:
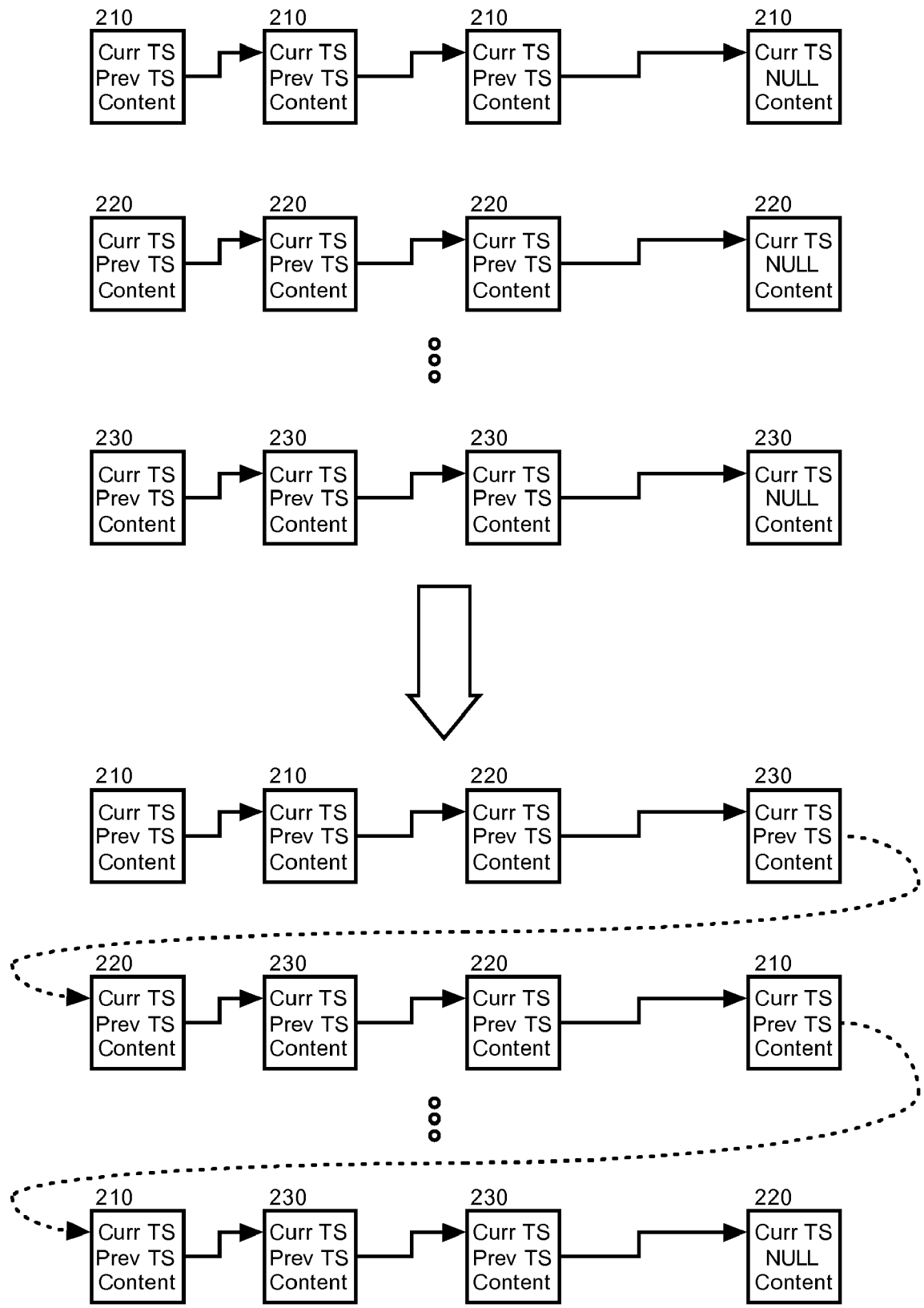
FIG. 2 is a block diagram of multi-source messages sequenced according to synchronized time stamps; and, FIG. 3 is a process for sequencing multi-source messages for delivery to multiple destinations.

In more particular illustration, FIG. 2 is a block diagram of multi-source messages sequenced according to synchronized time stamps. As shown in FIG. 2, initially, messages 210, 220, 230 can be received from multiple message sources in separate message streams. Each of the received messages 210, 220, 230 can be ordered according to time stamp such that each of the messages 210, 220, 230 has a pointer to a previous timestamp and a NULL value for the previous timestamp indicates the beginning of a message stream.

The different sequences of messages 210, 220, 230, each originating from different message sources, can be combined to form a unified sequence of messages according to timestamps applied to each of the messages. Additionally, within each different sequence of messages 210, 220, 230, a previous timestamp can point to the current timestamp of a previously received message in order to logically link together a proper ordering for the sequence of messages 210, 220, 230. Yet further, the messages 210, 220, 230 can become interleaved according to timestamp, whilst maintaining the time ordering of the messages 210, 220, 230. In as much as the clocks providing the timestamps in each of the message sources are synchronized, the timestamps can be relied upon when ordering the unified sequence.

Once the unified sequence has been created, subscribing message consumers (not shown) can receive all or a portion of the message sequence. Specifically, individual subscribing message consumers can request only those of the messages 210, 220, 230 meeting a specified criterion or criteria. As such, filtered ones of the messages 210, 220, 230 can be re-linked in a filtered sequence, again according to timestamp. Thereafter the re-linked filtered sequence of the messages 210, 220, 230 can be provided to the subscribing message consumer.

Figure 3:
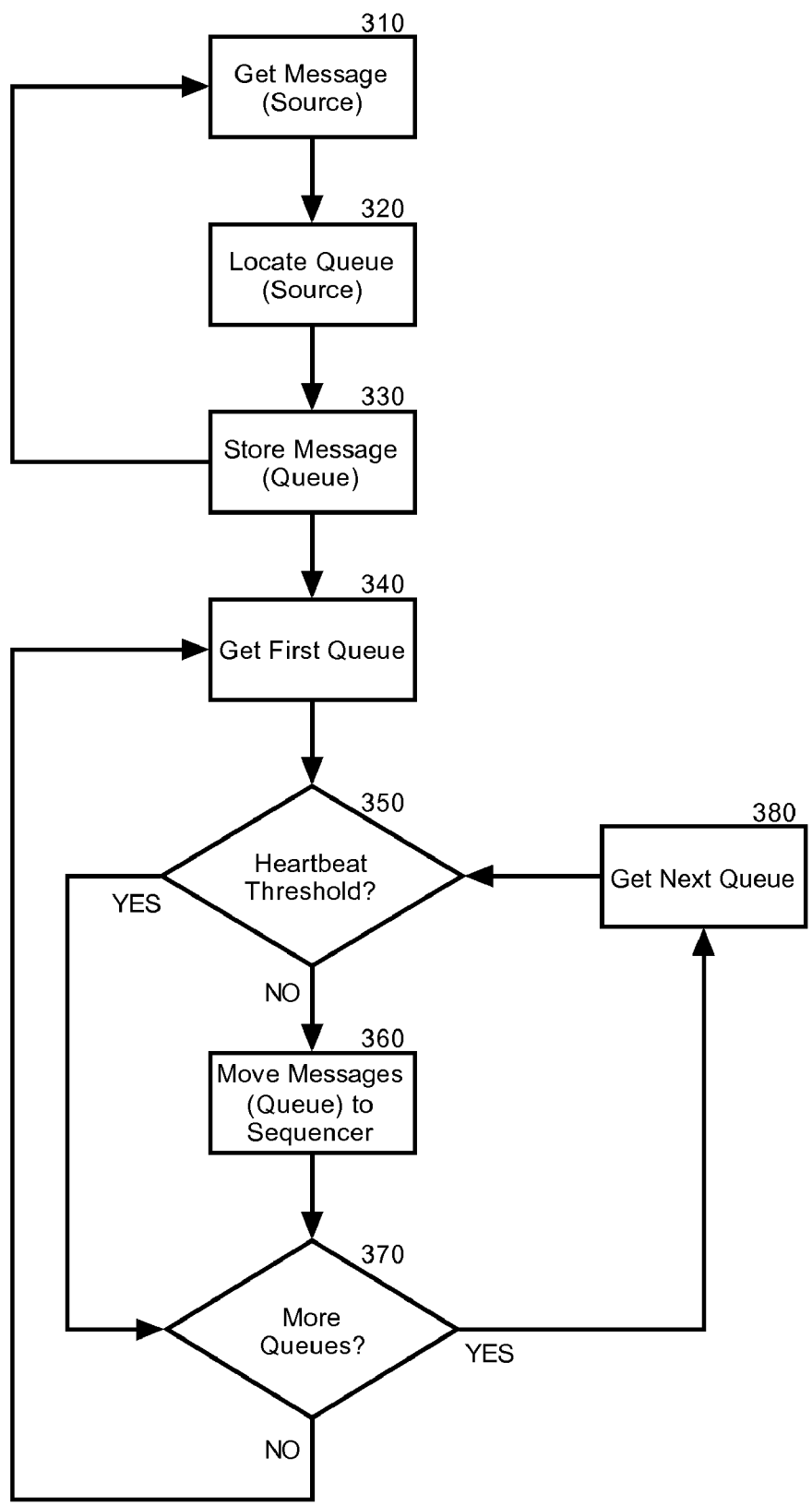

In yet further illustration, FIG. 3 is a process for sequencing multi-source messages for delivery to multiple destinations. The process can begin in block 310 when a message is received from one of multiple message sources. The message can include a message payload of message content along with a current timestamp and a previous timestamp. In block 320, a queue associated with the message source can be located and in block 330 the message can be stored in the located queue. The process can repeat in block 310 for subsequently received messages.

Whenever a message queue for a particular message source has received a complete sequence of messages, the messages can be moved to the sequencer for concatenation with other message sequences from other message sources according to timestamps relative to a common clock. To determine whether a complete sequence of messages has been received, a heartbeat signal is required of each message source. A common heartbeat threshold time is configured for the message sources and server. Each message source has a timer to record the amount of time that has passed since the last message was sent. Before that timer exceeds the heartbeat threshold time, the message source should send a heartbeat message to the message server. Otherwise, the message server will assume that the source has finished transmitting messages. Due to the varying delays between the message sources and server, the message server has to wait for a message from every source before it can forward the complete ordered sequence of messages to the destinations. Since the message server has to wait for a message from every source, the heartbeat messages are needed to reduce the amount of delay incurred from waiting on messages from less productive message sources.

In operation, in block 340, a first queue assigned to a corresponding message source can be selected for processing. In decision block 350, it can be determined whether a period of time has elapsed during which no heartbeat messages have been received from the corresponding message source indicating that a complete sequence of messages has not yet completed transmission. In decision block 350, if the heartbeat threshold is exceeded, it can be presumed that a complete sequence of messages had been received. Consequently, in block 360 the messages in the queue can be ordered according to timestamp and the messages in the queue can be moved to the sequencer for concatenation with other messages sequences from other message sources. Thereafter, in decision block 370, if more queues remain to be processed, in block 380 a next queue can be selected for processing. Otherwise, the process can repeat through block 340 for the first queue.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A multi-source message synchronization data processing system comprising:
a common clock;
a message server configured for communicative coupling to a plurality of message sources, each message source comprising a corresponding clock synchronized with the common clock; and,
multi-source message sequencing logic coupled to the message server, the sequencing logic comprising program code enabled to concatenate different message sequences produced by different ones of the message sources into a unified message sequence based upon timestamps applied by the message sources to messages in respective ones of the message sequences, wherein
each of the timestamps comprise a current timestamp and a previous timestamp, and
each of the different message sequences comprise a plurality of different messages wherein the previous timestamp of a message refers to a current stamp of a previous message.

2. The system of claim 1, wherein the common clock is configured to report a time based upon a network time protocol (NTP).

3. The system of claim 1, further comprising a heartbeat threshold beyond which a message source is considered to have completed transmission of a message sequence.

4. A method for sequencing multi-source messages comprising:
synchronizing a local clock for a message source with a common clock for the message source and other message sources;
timestamping a sequence of messages for transmission to a message server utilizing the local clock; and,
transmitting the sequence of messages to the message server for delivery to at least one message destination, wherein
the timestamping comprises:
setting a current timestamp for a current message to a current time provided by the local clock; and,
setting a previous timestamp for the current message according to a current timestamp for a previous message transmitted immediately previously to the current message.

5. The method of claim 4, wherein the synchronizing comprises:
requesting a time from the common clock according to the network time protocol (NTP); and,
setting the local clock with a time received from the common clock according to the NTP.

6. The method of claim 4, further comprising transmitting a heartbeat to the message server until no more messages remain to be transmitted as part of the sequence of messages.

* * * * *